United States Patent

Wilson

[11] Patent Number: 5,971,664
[45] Date of Patent: Oct. 26, 1999

[54] APPARATUS AND METHOD FOR ACCURATELY POSITIONING A CONDUIT

[75] Inventor: Harry L. Wilson, East Columbus, Ind.

[73] Assignee: Wilson Family Trust, Columbus, Ind.

[21] Appl. No.: 09/050,399

[22] Filed: Mar. 30, 1998

[51] Int. Cl.[6] ..................................................... F16L 1/00
[52] U.S. Cl. .............................. 405/154; 405/157; 248/49
[58] Field of Search .................................... 405/154, 157, 405/172; 248/49

[56] References Cited

U.S. PATENT DOCUMENTS

| | | | |
|---|---|---|---|
| 3,451,136 | 6/1969 | Shuttle, Jr. ............................... | 405/154 |
| 3,568,455 | 3/1971 | McLaughlin et al. ................... | 405/154 |
| 3,895,496 | 7/1975 | Perrott et al. ............................ | 405/157 |
| 4,043,139 | 8/1977 | Scott ........................................ | 405/154 |
| 4,993,160 | 2/1991 | Fraley ...................................... | 405/154 |
| 5,242,247 | 9/1993 | Murphy ................................... | 405/154 |
| 5,437,424 | 8/1995 | Netz, Sr. .................................. | 248/49 |

Primary Examiner—David Bagnell
Assistant Examiner—Frederick L. Lagman
Attorney, Agent, or Firm—Gary M. Gron

[57] ABSTRACT

Apparatus and a method for accurately positioning a conduit. The apparatus comprises a vertical tubular section with first and second arms at right angles to the vertical section. The first arm supports a conduit and the second is a fixed and accurate height above the first. A surveying instrument a removeably mounted on the second arm to enable the conduit to be accurately vertically placed. A set screw holds the vertical section in place.

20 Claims, 2 Drawing Sheets

APPARATUS AND METHOD FOR ACCURATELY POSITIONING A CONDUIT

BACKGROUND OF THE INVENTION

1. Field of the Invention

The present invention relates to positioning devices and more particularly to position devices which accurately position a conduit.

2. Description of the Prior Art

An integral part of a septic system is a field drain bed where the effluent is allowed to disperse over a wide area and be absorbed into the ground. Modern health department requirements in most governmental jurisdictions specify very tight limits on the geometry of a field drain bed. The field drain bed consists of a series of perforated conduits connected in parallel and laid in trenches with gravel or other granular material surrounding the conduits. One of the most critical parameters is the levelness of the conduits. It is common to require no more than a 2 inch variation in vertical position over the entire length of the conduits, usually about 100 feet. This is an especially daunting specification when one considers the circumstances under which the field drain bed is constructed. Usually the ground in which the trenches are formed is far from level. The trenches are cut out by a backhoe to a rough approximation. The conduit is laid throughout the trenches and then supported above the floor of the trench by a variety of devices. When the conduits are level, gravel or other granular material is dumped into the trench to support the conduits. U.S. Pat. No. 5,437,424 illustrates a device comprises of a vertical stake and right angle arms to support a conduit in a trench. When the conduit is at a desired level, gravel is place into the trench and the arms are rotated 90 degrees to enable the support assembly to be pulled out of the trench. The problem with this proposal is that it is very difficult to quickly drive the stake to a vertical position that measures up to the normal health department standards of levelness. U.S. Pat. Nos. 3,568,455, 4,043,139 and 5,242,247 go one step further by providing a vertically sliding element with support arms for more easily setting the vertical position. In each patent a set screw fixes the position. However, each of these prior art approaches fail to provide a means for accurately fixing the vertical position.

SUMMARY OF THE INVENTION

The above problems are solved by an apparatus and method for accurately positioning a conduit in a trench. A tubular vertical section is positioned over a vertical stake positioned adjacent the conduit to be positioned. A first arm extends from the vertical section and supports the conduit to be positioned. A second arm extends from the vertical section above and parallel to the first arm at a predetermined and precise distance from the first arm, the second arm having a reference surface for mounting a surveying grade rod through which the vertical position of the first and second arms is accurately determined. A releasable locking means holds the arms in place so that gravel or other supporting material may be placed in the trench to permanently support the conduit.

The present invention also relates to a method for accurately positioning the conduit.

DESCRIPTION OF THE INVENTION

Figures 1, 2:
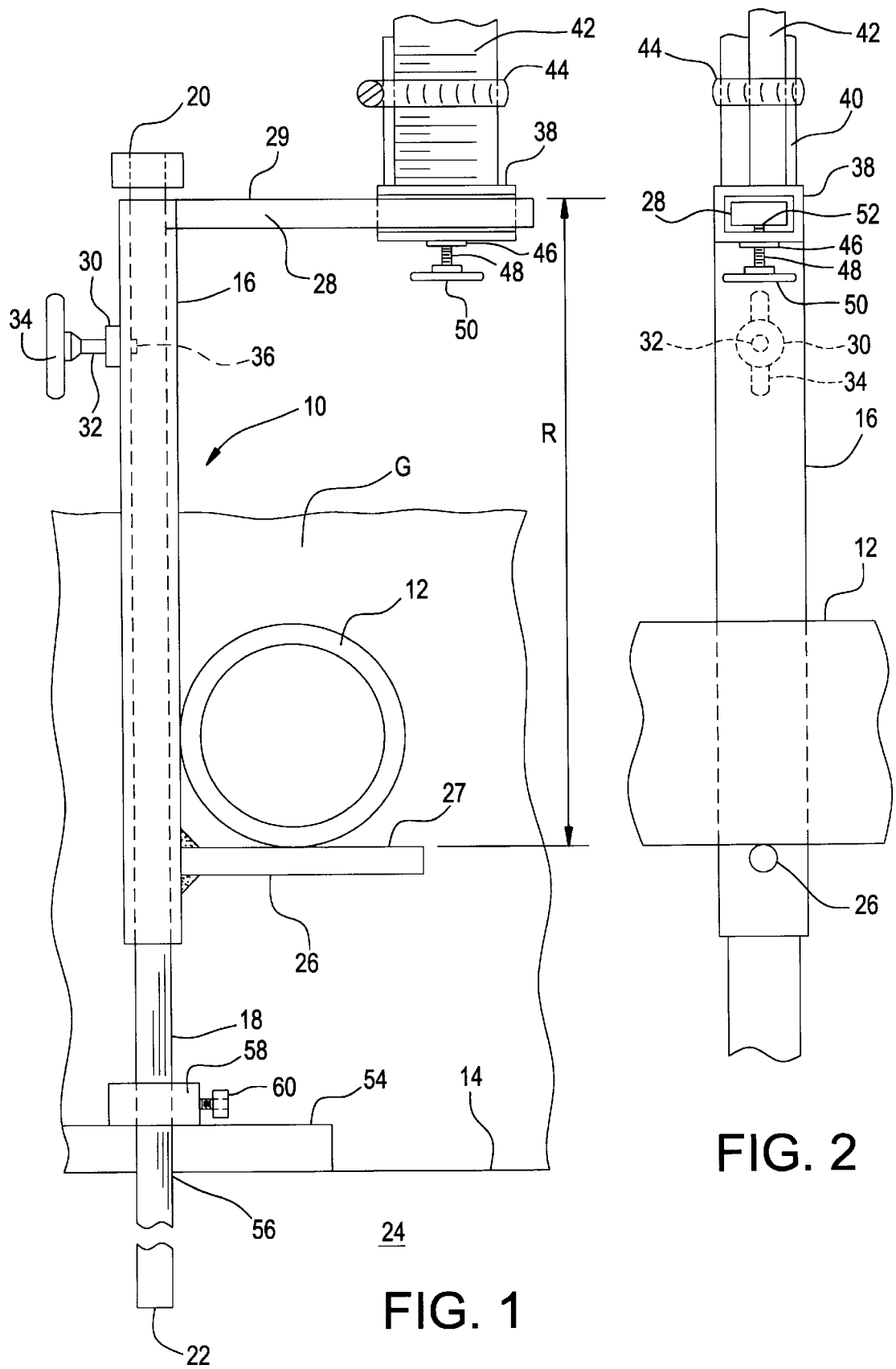
FIG. 1 illustrates a side elevation view of a conduit positioning apparatus which embodies the present invention.
FIG. 2 illustrates an end view of the apparatus of FIG. 1.

Referring to FIGS. 1 & 2 the present invention comprises a device 10 for quickly and accurately positioning a conduit 12 in a trough 14 formed in the ground 24. The apparatus 10 comprises a vertical tubular section 16 telescoped over a vertical stake 18 driven into the ground 24 by striking a head 20 at one end of the stake 18. For ease of assembly, head 20 may be a nut welded or otherwise fastened to stake 18. As illustrated, stake 18 is circular in cross section and has a squared off end 22 to more effectively stabilize and hold the weight of the conduit 12 and whatever support material is dumped into trough 14 to support conduit 12, The conduit 12 is directly supported by a first arm 26 extending from section 16 at a right angle. As illustrated, first arm 26 has a circular cross section(see FIG. 2) for purposes to be described later. A second arm 28 is fixed to section 16 above and parallel to arm 26 at a predetermined and precise distance from the first arm 26. Preferably, second arm 28 is positioned so that whenever gravel G, or other grannular support material fills trench 24, the second arm is above the expected height of the material. Second arm 28 has an upper reference surface 29 which is a fixed distance R from the upper surface 27 of first arm 26. Second arm 28 may be fixed to vertical section 16 by welding or other permanent means. Vertical section 16 is releaseably locked in a selected vertical position on stake 18 by means of a screw 32 threaded into and through a threaded opening provided by a nut 30 fastened to the exterior of vertical section 16. When screw 32 is turned in the clockwise direction, it is advanced so that end 36 abuts and holds vertical stake 18 relative to vertical section 16. A simple handle 34 is welded to screw 32 to enable easier and more effective hand manipulation by an operator.

As shown particularly in FIG. 2, the second arm 28 has a rectangular cross section which receives a tubular element 38 also having an interior rectangular shaped cross section so that tubular element 38 can slide onto and off of second arm 28 but cannot rotate relative to it. Tubular element 38 has a vertically extending L shaped bracket 40 which embraces two sides of a surveying grade rod 42. The surveying grade rod is held in place on the L shaped bracket 40 by a suitable worm gear clamp assembly 44 wrapped around the surveying grade rod 42 and the L shaped bracket 40. Surveying grade rod 42 is one part of a surveying system which consists of the grade rod 42 having graduated references indicating the vertical distance from a reference target that is positioned at a given position. A surveyors transit is mounted on the ground and the target is sighted to produce an accurate vertical position. The surveying grade rod may also be used in connection with a laser sighting system in which a target responds to being in a level laser beam with an audible or optical signal.

Tubular element 38 is releaseably held in place against reference surface 29 of arm 28 by a screw 48 threaded into and through a nut 46 welded to the bottom wall of tubular element 38. When screw 48 is turned clockwise, it is advanced so that its end face 52 abuts and holds in place the arm 28 and tubular element relative to one another. Handle 50, welded to the end of screw 48, enables more effecient operator manipulation.

When It is desired to place a conduit or other element at a predetermined and precise location, a trench is dug in the earth and the conduit laid along the bottom wall. The apparatus of the present invention is placed in initial position by driving the stake 18 into the ground immediately adjacent the conduit 12. The vertical section 16 is pivoted until the first and second arms 26 and 28, respectively extend across the conduit so that arm 26 supports the conduit and arm 28 is a fixed and precise vertical distance above. With the surveying grade rod 42 fixed on the arm 28, a surveying instrument is used to position the vertical section 16 in a precise vertical location. Once this is completed, the screw 32 is turned clockwise through the use of 34 to hold vertical section 16 in place. Gravel G or other granular material is placed in the trench 14 to surround and support conduit 12. When this is completed, arm 28 is pivoted at least 90 degrees so that arm 26 is pivoted out from under conduit 12. Arm 28 and vertical section 16 are then grasped by an operator and the entire assembly pulled from the gravel filled trench to leave the conduit in a precise and well supported position. If the trench is dug in particularly sandy or soft soil, it may be necessary to stabilize the placement of the stake 18 in the ground 24. For this purpose, a board 54 with a through hole 56 is placed on the floor of the trench 14. The stake 18 receives a locking collar 58 having a set screw 60 to hold the collar in a given position along the length of stake 18. The locking collar 58 is positioned along stake 18 so that when the collar 58 abuts board 54, the apparatus 10 is set up for fine adjustment of the height of arm 26 and thus conduit 12. When adjustment of the height is completed and the gravel G placed in the trench 14, the apparatus 10, including locking collar 58, is pulled from trench 14 leaving the board 54 in place.

Figure 3:
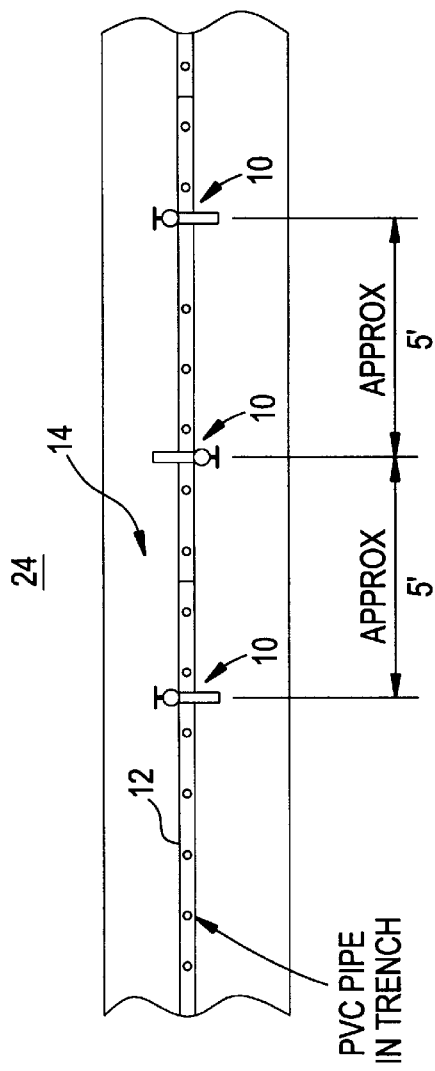
FIG. 3 illustrates a plan view of a field drain in which the present invention is used to accurately position the conduit.
Figure 4:
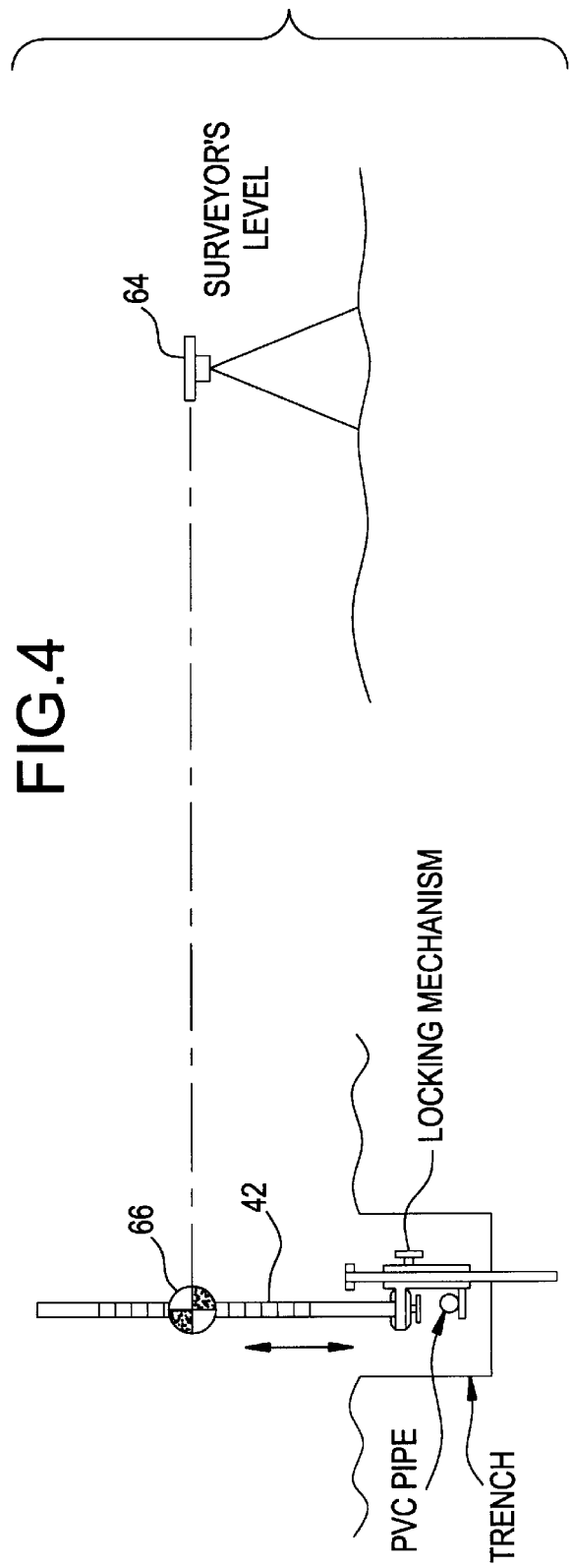
FIG. 4 illustrates a side view showing how the present invention is used to position the conduits of FIG. 3.

FIGS. 3 and 4 show how a multiplicity of apparatus 10 is used to quickly and accurately position and elongated conduit 12 in an elongated trench 14 formed in the ground 24. Conduit 12 usually consists of separate sections connected to one another to form the entire length of conduit 12. Elongated conduit 12 is laid in position along the bottom floor of trench 24. A multiplicity of devices 10 are placed in the trench 24 so that adjacent divices are on opposite sides of the conduit 12 to restrain conduit 12 in a given lateral position. The stakes 18 are driven into the ground 24 so that they are orientented vertically. The vertival section 16 is pivoted so that arm 26 extends across and under conduit 12. Each vertical section is moved up on its associated stake 18 in turn to place the conduit in an apporximate position.

As shown particularly in FIG. 4, the tubular element 38, with the connected surveying grade rod 42 is placed on each second arm 28 in turn. The height of the reference surface 29, and therefore the height of conduit 12, is adjusted by sighting with a surveyor'level 64 on a target 66 fixed to surveying grade rod 42. For purposes of illustration, the surveyors level in FIG. 4 is moved out to the side of the conduit 12. In practice, the surveyor's level would be positioned at any location giving line of sight observation of the target 66. In some cases the surveyor'level 64 would be placed near the longitudinal axis of the conduit 12. The surveyor'level 64 remains in place as the tubular element 38 and connected surveying grade rod 42 is placed on each second arm 28 to enable precise adjustment of that section of the elongated conduit 12. The surveyor's level shown in FIG. 4 requires two operators for the leveling procedure, one to sight on the target and the other to move the device 10 vertically and lock it in position. With modern laser surveying devices, the target 66 is an electronic component which emits an audible sound when it is in a laser beam generated by the equivalent of the surveyor's level. As a result, a single operator may do the entire adjustment procedure. When the conduit is positioned, the tubular element 38 and connected surveying grade rod 42 are removed from the last second arm 28. Gravel G or other material is placed in the trench 24 to a level which is lower than the level of the second arm 28. Each device 10 is rotated at least 90 degrees so that arm 26 clears conduit 12 and it is pulled from the trench 24 leaving the elongated conduit 12 permanently supported by the gravel G.

It has been found that the above apparatus and method enable an accuracy and speed that has heretofore not been obtainable with prior leveling devices. The devices 10 are reusable and only one set of surveying instruments is needed to make the vertical adjustment. Although a particular form of the present invention has been described, it should be apparent to those skilled in the art that it may take different forms without departing from the spirit and scope of the present invention.

Having thus described the invention, what is novel and desired to be secured by Letters Patent of the United States is as follows.

I claim:

1. Apparatus for accurately positioning a conduit in a trench formed in the ground, said apparatus comprising:

a tubular vertical section slidingly positionable over a vertical stake driven into the ground in said trench, a first arm fixed to and extending at a right angle from said tubular vertical section, said first arm being adapted to support a conduit in said trench, a second arm fixed to and extending from said tubular vertical section above and parallel to said first arm at a predetermined and precise distance from said first arm, said second arm having a reference surface for mounting a surveying grade rod through which the vertical position of the first and second arms is accurately determined, and means for releaseably locking said vertical section in said vertical position on the stake, whereby the conduit is accurately positioned in said trench to enable gravel or other material to surround and permanently support the conduit in said trench.

2. Apparatus as in claim 1 wherein said tubular vertical element has a square shaped cross section.

3. Apparatus as in claim 2 wherein said second arm has a rectangular shaped cross section.

4. Apparatus as in claim 3 wherein said first and second arms are welded to said vertical section.

5. Apparatus as in claim 2 wherein said releaseable locking means comprises a screw threaded into the interior of said tubular vertical section for releasably clamping the vertical stake relative to said tubular vertical section.

6. Apparatus as in claim 5 further comprising a handle on said screw to enable hand manipulation of said screw.

7. Apparatus as in claim 1 further comprising a plurality of assemblies of said vertical section, said first and second arms and said locking means whereby elongated sections of conduit may be accurately positioned.

8. Apparatus as in claim 7 wherein adjacent assembles are positioned on opposite sides of the conduit so that the conduit is positioned laterally in the trench.

9. Apparatus as in claim 1 further comprising:

means for mounting the surveying grade rod, and means for releasably mounting said surveying grade rod mounting means to said second arm.

10. Apparatus as in claim 9 wherein said surveying grade rod mounting means is tubular with a rectangular shaped cross section for telescoping over said second arm.

11. Apparatus as in claim 10 wherein said releasable fixing means for the surveying grade rod mounting means comprises a screw threaded into the rectangular shaped tubular element to clamp said second arm.

12. Apparatus as in claim 11 further comprising a handle on said screw for enabling hand manipulation thereof.

13. Apparatus as in claim 10 wherein said surveying grade rod mounting means further comprises a plate extending at a right angle to and affixed to said rectangular cross section tubular element for providing a mounting surface which orients the surveying grade rod parallel to said vertical tubular element.

14. Apparatus as in claim 1 wherein said vertical tubular element is swivelable to a position where the first arm clears the conduit so that the assembly and rod may be removed from the ground.

15. Apparatus as in claim 14 wherein said first arm has a circular cross section thereby minimizing resistance to movement through granular support material.

16. A method for accurately and permanently positioning a conduit in a trench formed in the ground, said method comprising the steps of:

extending an assembly of a vertical tubular element having first and second parallel arms over said conduit, said first arm supporting said conduit and said second arm being positioned a predetermined and accurate distance from and sufficiently above said first arm to be free of any material used to permanently support said conduit, driving a vertical stake through said vertical tubular element and into the ground in said trench, attaching a surveying grade rod to said second arm, sighting on said surveying grade rod to move said vertical tubular element vertically to position the conduit at a precise vertical position, locking said vertical tubular element to said vertical stake so as to establish the vertical position of said conduit, and filling the trench with granular support material for permanent positioning of said conduit.

17. A method as in claim 16 comprising the further steps of:

after the trench is filled with granular material, pivoting the assemblies about said vertical stake so that the first arm is clear of said conduit, and pulling the assembly and vertical stake from the ground for reuse.

18. A method as in claim 16 wherein a plurality of assemblies and vertical stakes are spaced along the length of said conduit, said adjacent stakes being positioned on opposite sides of the conduit with the arms extending across the centerline of said conduit to restrain it laterally.

19. A method as in claim 18 wherein said surveying grade rod is sequentially fixed to said second arms for fixing the vertical position of said conduit along its length.

20. A method as in claim 16 wherein the trench is formed in soft or sandy soil in the ground, the method comprising the further steps of:

positioning a board in the trench under the conduit, said board having a through hole in line with the vertical stake, positioning a set collar over the stake beneath said assembly, fixing the set collar at a level which roughly approximates the vertical position of said stake in the trench, inserting said stale through the opening in said board until said collar abuts said board, whereby said stake in supported in a stable fashion during accurate positioning of said conduit.

* * * * *